United States Patent [19]
Aiston

[11] Patent Number: 5,975,452
[45] Date of Patent: Nov. 2, 1999

[54] RETRACTOR

[75] Inventor: Brian Edward Aiston, Devon, United Kingdom

[73] Assignee: Breed Automative Technology, Inc., Lakeland, Fla.

[21] Appl. No.: 08/952,297

[22] PCT Filed: May 15, 1996

[86] PCT No.: PCT/GB96/01158

§ 371 Date: Jul. 20, 1998

§ 102(e) Date: Jul. 20, 1998

[87] PCT Pub. No.: WO96/36509

PCT Pub. Date: Nov. 21, 1996

[30] Foreign Application Priority Data

May 15, 1995 [GB] United Kingdom .................... 9509779

[51] Int. Cl.[6] .................................................. B60R 22/42
[52] U.S. Cl. ..................................... 242/381.4; 242/382.6
[58] Field of Search ............................. 242/381.1, 381.4, 242/382.6; 280/806; 297/478, 480

[56] References Cited

U.S. PATENT DOCUMENTS

| | | | |
|---|---|---|---|
| 4,949,995 | 8/1990 | Haland et al. | 242/381.4 |
| 4,997,140 | 3/1991 | Doty | 242/381.4 |
| 5,044,575 | 9/1991 | Knabel et al. | 242/381.4 |
| 5,511,741 | 4/1996 | Zolkower et al. | 242/381.1 |
| 5,647,553 | 7/1997 | Smithson et al. | 242/381.1 |

*Primary Examiner*—John M. Jillions
*Attorney, Agent, or Firm*—Markell Seitzman

[57] ABSTRACT

A web locking retractor (20) for a vehicle safety restraint system is described comprising a spool assembly (60) mounted for linear movement with respect to a wedge housing frame (22) such that linear movement of the spool assembly (60), e.g. vertically, pushes against one or more clamping wedges (46a,b) to clamp a seat belt therebetween, characterized in that the spool assembly (60) is operatively coupled to the at least one clamping wedge (46a,b) via a resilient member, such as a coil spring (36a,b). The spool assembly (60) is operatively coupled to the at least one clamping wedge (46a,b) and this coupling is advantageously via a resilient member such as a coil spring (36a,b). Such a direct link between the clamping wedge (46a,b) and the spool assembly (60) provides for faster, more effective release of the clamping wedge (46a,b) from the belt when the loading on the belt diminishes below the spring bias force.

8 Claims, 6 Drawing Sheets

RETRACTOR

DESCRIPTION

The present invention relates to a web locking retractor for a vehicle safety restraint system.

According to the present invention there is provided a web locking retractor for a vehicle safety restraint system, comprising a spool assembly constrained and mounted for linear sliding movement with respect to a wedge housing such that linear movement of the spool assembly slides one or more seat belt clamping wedges in a linear motion relative to the wedge housing for clamping and unclamping a seat belt therebetween, characterised in that the spool assembly is directly operatively coupled to at least one clamping wedge so as to slide with the wedge in clamping and unclamping directions and the spool assembly is biased to a seat belt unclamped condition by a resilient means arranged to act between the spool assembly and at least one part fixed with respect to the wedge housing.

In one embodiment the spool assembly alone moves, and in another embodiment the spool assembly is mounted within a retractor frame which is also linearly movable with the spool assembly to activate the wedges.

Such a direct link between the clamping wedge and the spool assembly provides for faster, more effective release of the clamping wedge from the belt when the loading on the belt diminishes below the spring bias force.

For a better understanding of the invention and to show how the same may be carried into effect, reference will now be made to the accompanying drawings in which.

Figure 1:
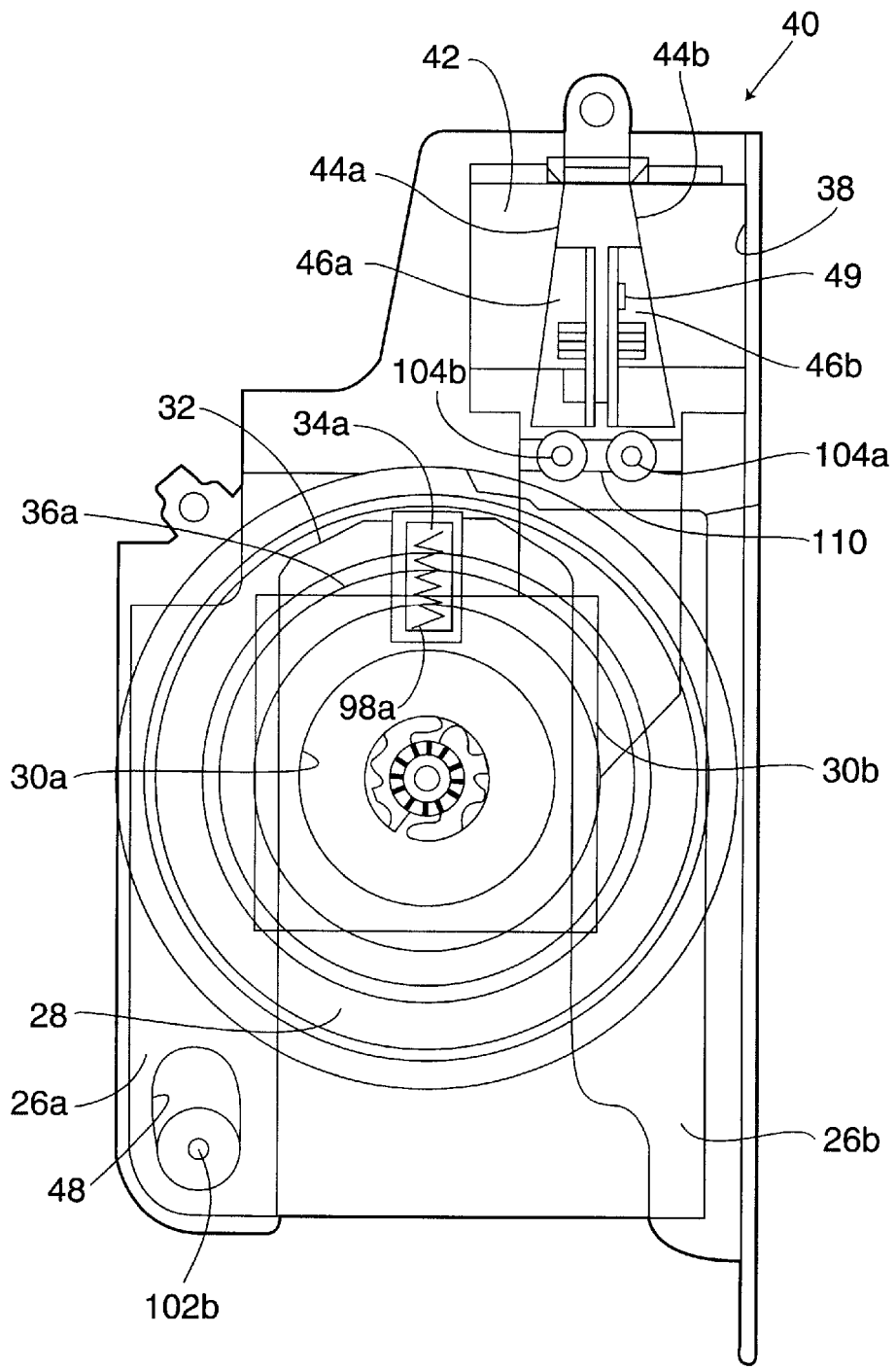
FIG. 1 is a right-hand view of a first embodiment of an assembled retractor.
Figure 2:
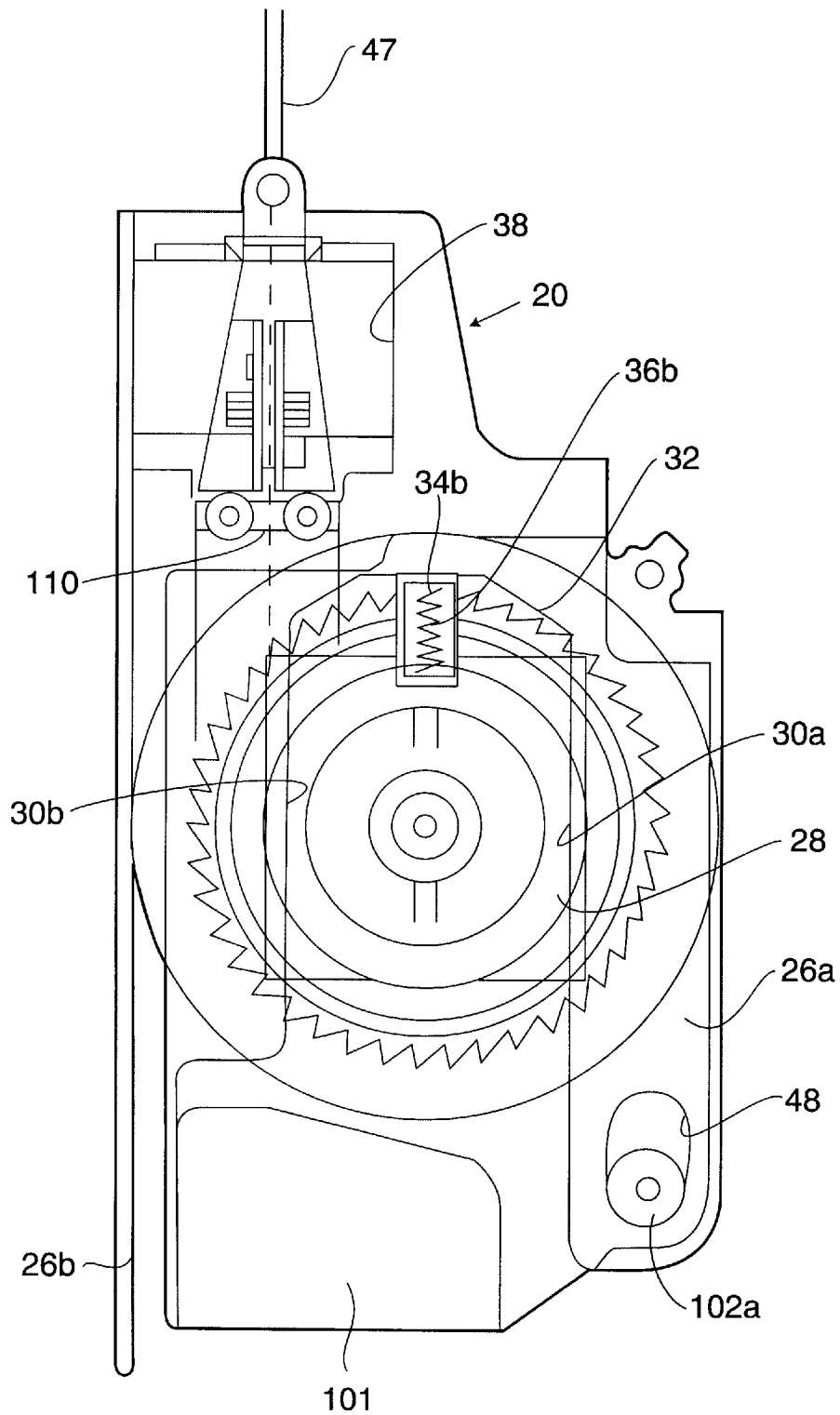
FIG. 2 is a left-hand view of the retractor of FIG. 1.
Figure 3:
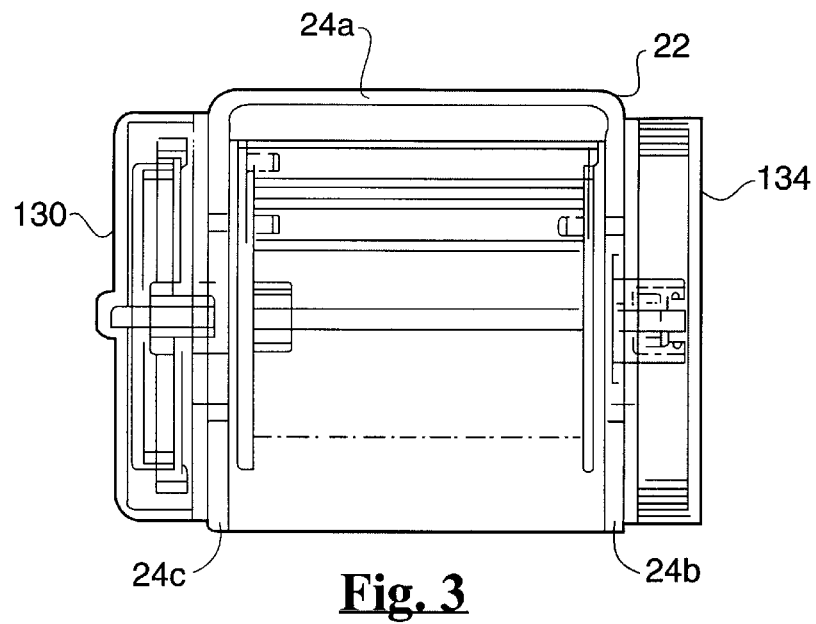
FIG. 3 is a top view of the retractor of FIG. 1.
Figure 4:
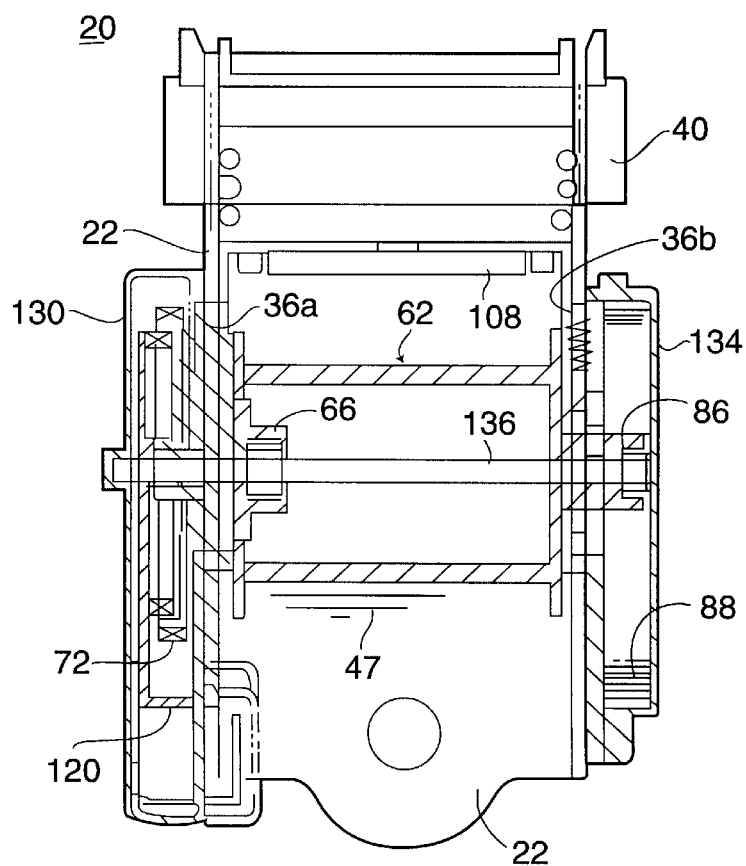
FIG. 4 is a front plan view of the retractor of FIG. 1.

With reference to FIGS. 1 to 5 which show a retractor 20 having a U-shaped wedge housing frame 22. The frame includes a rear 24a, and two sides 24b and c. Each side includes two legs 26a and b. The inner edges of the legs define an opening 28 therebetween. The opening includes straight walls 30a,b and a somewhat oval top contour 32. A boss 34a and 34b extends down into a respective opening 28 on either side of the retractor. A return spring 36a,b extends down from a respective boss to bias a slider mechanism assembly 90. The frame 22 also includes an opening 38 near its top. Situated within this opening is a wedge housing assembly 40 which includes a wedge housing 42 having two sloping, facing walls 44a,b and two movable wedges 46a,b therebetween. As is known in the art these wedges can be separate or as shown linked by pins 49 and outwardly movable by bias springs. The front faces of each of these wedges may support a plurality of teeth which enter into a seat belt that passes therebetween. As discussed below as the wedges are moved upwardly the sloping wall assists in moving the wedges closer to and against the seat belt positioned therebetween to clamp the seat belt 47. In this embodiment one of each of the frame legs 26a includes an oval slot 48.

Rotatably mounted in the wedge housing frame 22 is a spool assembly 60 comprising a spool 62 upon which the seat belt 47 (also called webbing) is wound. The spool includes flanges 64a,b to provide a boundary for the wound webbing. The spool includes on its left side a recessed cylindrical wall 66 defining a cavity 68 therein and pin openings 70a,b for receipt of a ratchet gear 72 having outer ratchet teeth 74 and locating pins 76 (received in the openings 70a,b) and a stem 80 received in mating splines 81 within the cavity 68 linkng the ratchet gear 72 so that it rotates with the spool 62. While not shown an inertial mass of known variety is positioned in the cavity 82 of the ratchet gear and forms part of a web sensor which when activated will initiate lockup of the retractor when the webbing is pulled out faster than a predetermined rate. The spool 62 also includes two circular bosses 84a,b. Extending outward from boss 84b is a spring arbor 86 engaged by a rewind spring 88, see FIG. 5. The spool 62 is rotationally supported in a slider assembly mechanism housing 90, which defines a frame for the spool assembly 60. The slider housing 90 includes a first side plate 92a having a boss 95 with a circular opening 96a which serves as a bushing or bearing 96b to rotationally support the boss 84a of the spool. Similarly a second plate 92b includes an opening to support the other end of the spool 62 at the boss 84b. Each plate includes a protrusion 98a,b to receive a corresponding end of the return spring 36a,b. At the lower extreme of plate 92a there is formed an integral cavity 101 into which is received a vehicle sensor (not shown) comprising an inertia mass such as a ball or standing man and a rotating sensor pawl. The cavity serves as a dust cover for this sensor. The sensor is attached to a multi-function piece 120 as described below. The lower part of each leg 26a also includes an extending pin 102a,b slidably received in a corresponding slot 48. Each plate further includes two inwardly extending pins 104a,b (only the front pins can be seen in the FIG. 5) received with mating recesses in a bridge member 108 that is also part of the housing 90. The bridge member serves to link the plates 92a and b together and also serves an a webbing guide through which the seat belt 47 (or webbing) is threaded. To this end the member 108 includes a slot 110 to receive the webbing. The member 108 also includes an extending boss 109 which operates as a push arm to move one or both of the wedges 44a or 44b upwardly with the wedge housing 42. In the embodiment below the member is positively linked to one of the wedges. Such option could be included in this embodiment.

Figure 5:
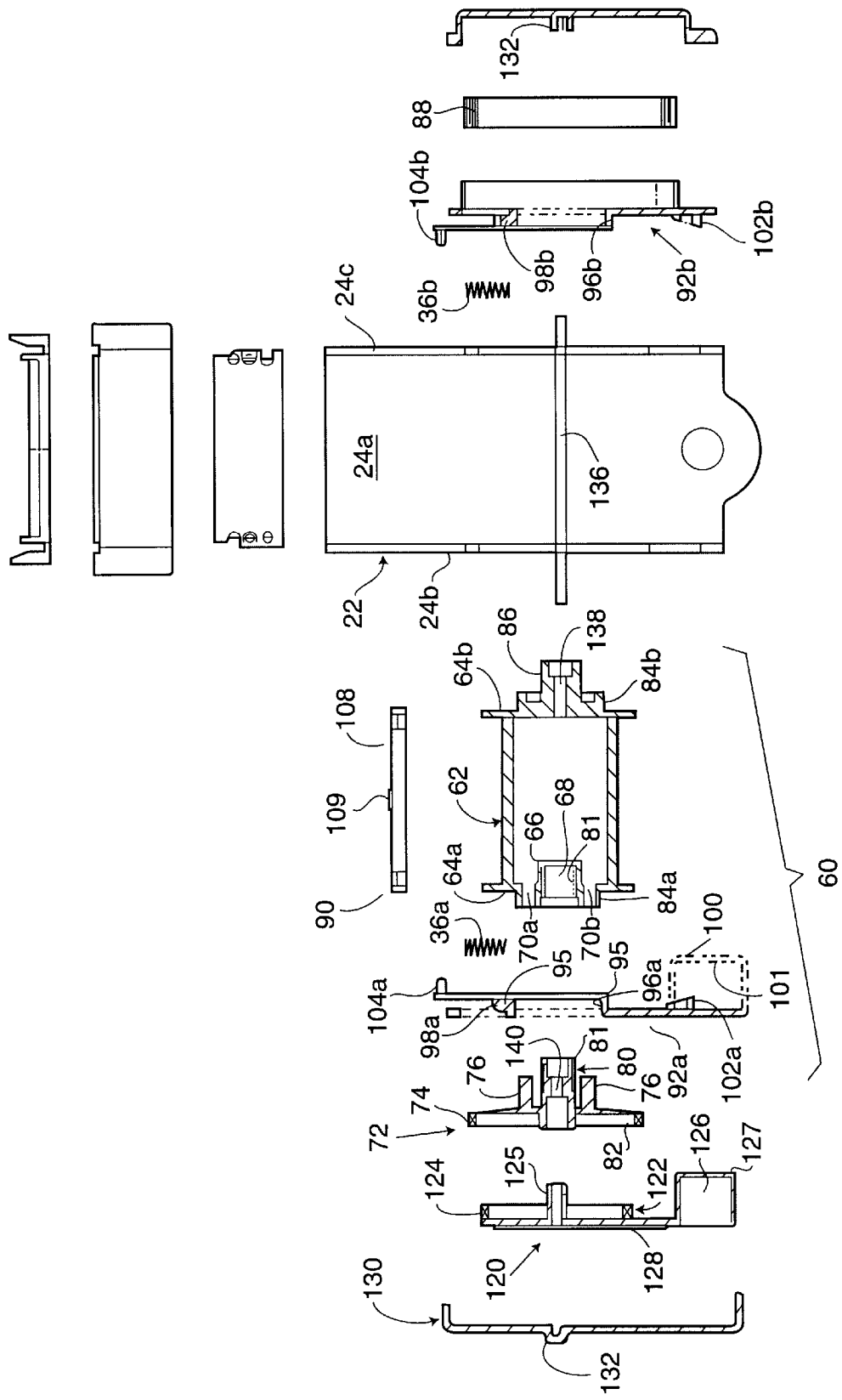
FIG. 5 is an assembly view showing many of the major components of this first embodiment of the invention.

Returning to the left hand side of FIG. 5 the multi-function piece 120 includes an inwardly directed cup 122 having teeth 124 thereon and an extending hollow boss 125. At the lower end of piece 120 is a cavity 126 into which is mounted the vehicle sensor. The sensor pawl of the vehicle sensor extends through a slot in a wall 128 of the piece 120 so that it can engage (when moved by the inertia mass) the teeth 74 of the ratchet gear 72. The piece 120 is covered by a mechanism end cover 130 which includes a hollow boss 132. The cover 130 is secured to and movable with the plate 92a. Similarly the rewind spring 88 is covered by a spring cover 134, having another hollow boss 132 which is attached to the plate 94b. A pin 136 is fitted to the hollow bosses 132 and is loosely fit in a narrow hole 138 in the spool 62 and in a narrow hole 140 in the ratchet gear 72. The pin provides the rotational axis of the spool.

In operation when the webbing is pulled out, as a result of occupant loading, faster than the predetermined rate a movable part (such as an inertia mass) of the web sensor rotatable with the ratchet gear moves outwardly to engage the teeth 124 on the multi-function piece 120 thereby coupling the piece 120 to the rotation of the spool 62.

Similarly, when the vehicle decelerates greater than a preset limit the vehicle sensor pawl is moved upwardly by the inertia mass of the vehicle sensor into engagement with the ratchet teeth 74 also coupling the multi-function piece 120 to the rotation of the spool 62.

During an accident the occupant will load the seat belt causing the spool to rotate and as it does it will rotate the now coupled multi-piece 120 with it. The rotation of the multi-function piece 120 is limited since the walls 127 defining cavity 126 will hit the wall of the cavity 101 stopping its rotation. At this moment in the accident the rotation of the spool is completely blocked. Any further force exerted on the belt by the occupant in excess of the downward bias force imparted to the assembly 90 lifts the spool 62, plates 94, ratchet gear, piece 120, spring 88 and covers 130 and 134. As the spool lifts, the web guide/bridge 108 moves at least one wedge upward closing the spacing between it and the other wedge clamping the webbing there between. As the spacing narrows between the wedges the wedge teeth, if used enter into the webbing. Any upward movement of the webbing drags both wedges 46a,b upward assisting in closing the spacing therebetween. As can be appreciated from the above the multi-function piece 120 need not rotate and need not rotate with the spool. This can be accomplished by making the dimensions of the cavity 101 coextensive with the outside of cavity 126 or adding a pin linking the plate 92a and piece 120.

Figure 6:
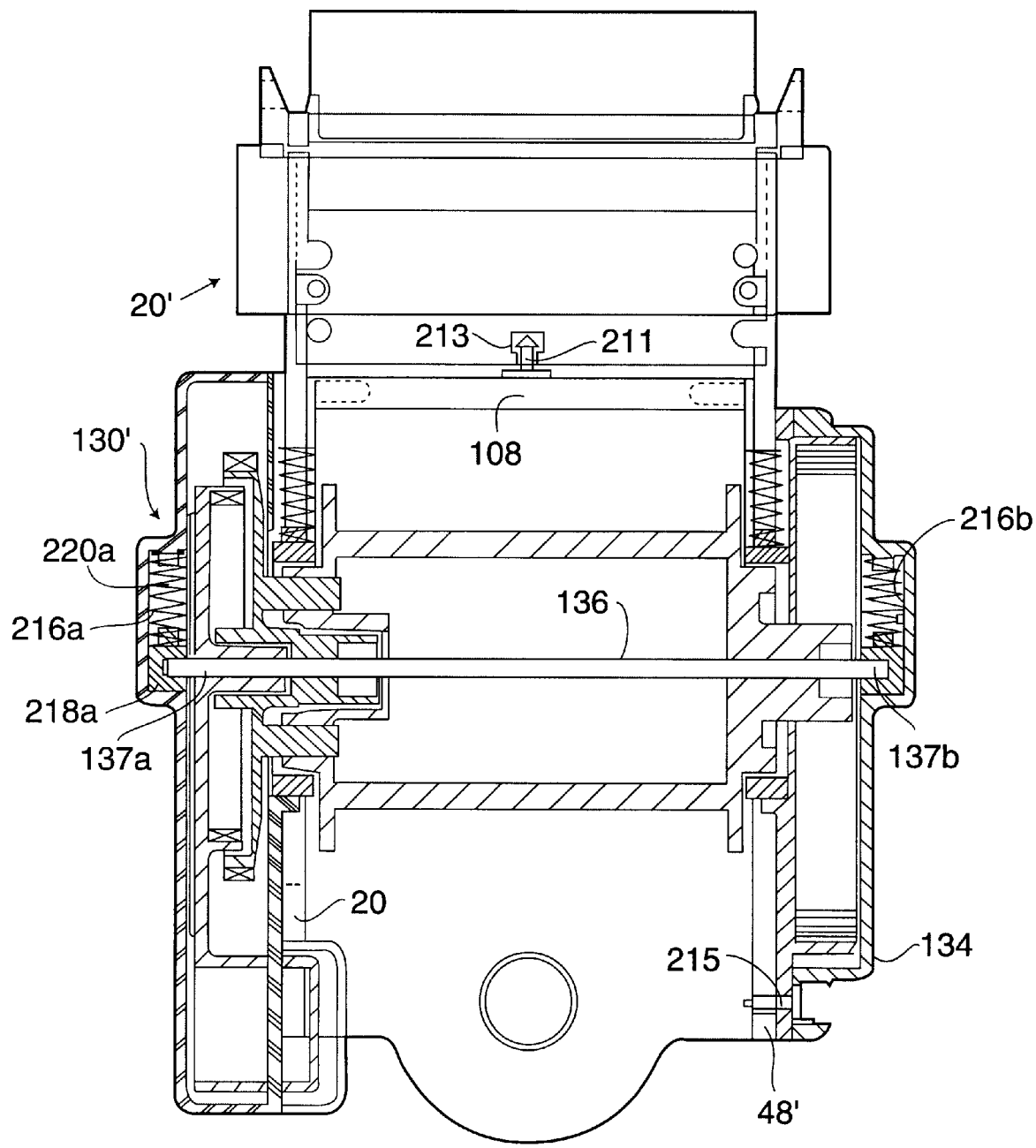
FIG. 6 is a cross-sectional view of another embodiment of this invention.
Figure 7:
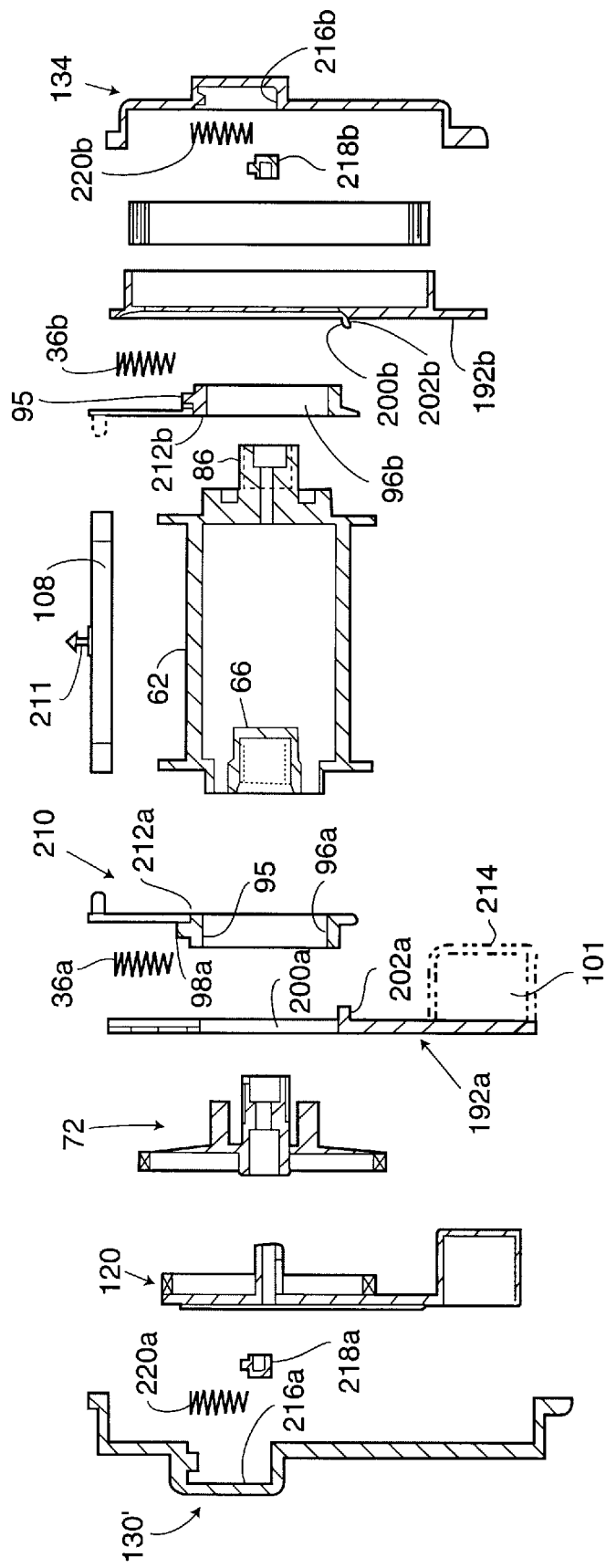
FIG. 7 is an assembly view of the embodiment of FIG. 6.

FIGS. 6 and 7 show another embodiment of the invention. The embodiment uses many of the same components as the first embodiment. In this embodiment fewer parts are lifted upward and as a result less force is needed to overcome the inertial of these movable parts. The retractor 20' uses the same wedge housing frame 22 with the exception that the slot 48 is replaced with a circular hole 48'. The spool 62, ratchet gear 72, multi-function piece 120 and pin 136 are identical to that described above. The plates 92a,b have been modified. In this embodiment the function of the plates 92 and the bushing 96 have been separated. As an example, plate 192a includes cavity 101 to receive the vehicle sensor. The plate 192a includes a rectangular opening 200a and a lower ledge 202a defining a motion stop. In this embodiment the plate 192a is fixedly attached to one of the frame side legs such as 26b by a fastener 215 extending through hole 48'. Plate 192b (previously plate 94b) now similarly includes another rectangular opening 200b and a stop 202b. The slider mechanism 210 in this embodiment comprises two side plates 212a and b and the bridge 108. The bridge is attached to these slide plates in a similar manner as described above. The bridge 108 includes a notched pin 211 received within a stepped groove 213 in one of the wedges 46a. In this matter the bridge 108 is positively joined to the wedge. The benefit of this construction is that the wedges are automatically biased downward by the return springs 36a and b resulting in a quick release of the webbing 47. Side plate 212a includes a boss 95 defining an inner circular opening 96a which serves as a bushing to support the spool. The outer walls 214 of boss 95 are squared to be slidably received in the straight walls of opening 200a (which as can be seen also acts a bushing). Return spring 36a is received upon boss 98a. Plate 212b includes boss 95, and inner circular opening 96b, and on outer squared wall that is received in opening 200b. The mechanism side cover now referred to as 130' includes a vertical extending groove 216a and the rend sprig cover 134 similarly includes another groove 216b. As before the pin 136 extends through the spool, ratchet gear and mult-function piece. In this embodiment the end 137a of the pin is movable in the groove 216a.

FIG. 6 shows an optional mode of attachment in which the end 137a of the pin is received within a small carrier 218a the outer dimension of this is chosen to permit it to slide within groove 216a. An additional bias spring 220a biases the carrier 218a and pin downwardly. As can be seen the spring 220a is appropriately secured by bosses on the carrier and cover 130'. The spring cover 134 is similarly configured having a groove 216b, a carrier 218b and return spring 220b. If the carriers 218a,b and springs 220a,b are removed it should be appreciated that the width of the grooves 216a,b in the covers should be narrowed to provide for a sliding bushing support for the ends 137a,b of the pin 136.

In operation upon locking of the spool 62 upon activation of either of the web or vehicle sensor, a continued force on the webbing 47 lifts the spool 62 and plates 212a,b and bridge 108 to move the wedges upwardly to clamp the webbing therebetween. As can be seen from the above fewer parts of the retractor are lifted in this second embodiment than in the first embodiment. As the occupant force diminishes below that of the return bias then the return bias forces the bridge 108 (and wedges by virtue of the direct link) and spool downwardly.

It will be seen in this embodiment that movement of the spool 62 causes movement of the centre of the retractor rewind spring 88 in a vertical direction since the centre of the rewind spring is fixed to the spool axis. However the outer part of the rewind spring is fastened to the spring cover 134 which does not move since it is fixed by screw or bolt 215. Thus movement of the spool causes a small distortion of the rewind spring.

The return bias provided by springs 36a and b provides for a particularly quick release of the web clamping action. The direct connection to the wedges provided by these springs enables the weight of the spool to be effective in pulling the wedges down and out of engagement. In known web locking retractors only the gravitational pull on the wedges was relied on, aided by expensive anti-friction coatings on the inside surfaces of the wedge housing. However the arrangement illustrated and described gives significantly better performance without the expensive coating. This is particularly important in the locking conditions of normal use, e.g. when the vehicle is cornering or braking suddenly and the g forces exceed the level needed to trigger the web clamping mechanism (typically over 0.45 g) but are not sufficient to indicate a full crash situation. The quick release of the wedges also reduces wear on the safety belt itself and reduces the bursting forces in the wedge housing so that the size of the housing can be reduced with attendant cost savings.

I claim:

1. A web locking retractor for a vehicle safety restraint system, comprising a spool assembly constrained and mounted for linear sliding movement with respect to a wedge housing such that linear movement of the spool assembly, slides one or more seat belt clamping wedges in a linear motion relative to the wedge housing for clamping and unclamping a seat belt therebetween, wherein the spool assembly is directly operatively coupled to at least one clamping wedge so as to slide with the wedge in clamping and unclamping directions and the spool assembly is biased to a seat belt unclamped condition by a resilient means arranged to act between the spool assembly and at least one part fixed with respect to the wedge housing;

comprising a retraction spring for the spool, for biasing the spool in a belt rewinding direction, wherein one end of the retraction spring is attached to the spool shaft and one end is attached to the part fixed relative to the wedge housing.

2. A retractor according to claim 1, wherein the spool assembly is rotationally supported within a slider mechanism assembly which defines a frame for the spool assembly, the slider assembly being linearly movable with the spool assembly to activate the wedges.

3. A retractor according to claim 1, wherein the spool assembly is supported by a slider mechanism assembly that is linearly movable with respect to the wedge housing, and wherein the resilient means comprises at least one return spring arranged to act between the slider mechanism assembly and the wedge housing.

4. A retractor according to claim 3, wherein the fixed part comprises a mechanism end cover.

5. A retractor according to claim 4, wherein the resilient means comprises a coil spring acting at each end of the spool assembly.

6. A retractor according to claim 1, wherein the spool assembly is operatively coupled to a clamping wedge by means of a notched pin interlocking with a stepped groove.

7. A web locking retractor for a vehicle safety restraint system, comprising a spool assembly constrained and mounted for linear sliding movement with respect to a wedge housing such that linear movement of the spool assembly, slides one or more seat belt clamping wedges in a linear motion relative to the wedge housing for clamping and unclamping a seat belt therebetween, wherein the spool assembly is directly operatively coupled to at least one clamping wedge so as to slide with the wedge in clamping and unclamping directions and the spool assembly is biased to a seat belt unclamped condition by a resilient means arranged to act between the spool assembly and at least one part fixed with respect to the wedge housing;

wherein the resilient means comprises springs acting on mounting bushes at respective ends of the rotatable spool.

8. A retractor according to claim 7 wherein the resilient means comprises at least one coil spring.

* * * * *